United States Patent [19]

Yorinaga et al.

[11] Patent Number: 4,658,650
[45] Date of Patent: Apr. 21, 1987

[54] VIBRATION AND ACOUSTIC WAVE DETECTING DEVICE EMPLOYING A PIEZOELECTRIC ELEMENT

[75] Inventors: Muneo Yorinaga, Anjo; Sumiharu Yokoiwa, Kariya; Hiroaki Yamaguchi, Anjo, all of Japan

[73] Assignee: Nippondenso Co., Ltd., Kariya, Japan

[21] Appl. No.: 768,151

[22] Filed: Aug. 22, 1985

[30] Foreign Application Priority Data

Aug. 28, 1984 [JP] Japan ................. 59-178661

[51] Int. Cl.$^4$ .................. G01H 1/00; H04R 17/00
[52] U.S. Cl. ..................................... 73/654; 73/35;
73/632; 310/317; 310/329; 310/366
[58] Field of Search ................. 73/35, 654, 632;
310/317, 319, 322, 366, 329

[56] References Cited

U.S. PATENT DOCUMENTS

| | | | |
|---|---|---|---|
| 2,289,954 | 7/1942 | Arndt, Jr. | 310/319 X |
| 2,691,159 | 10/1954 | Heibel | 310/319 |
| 2,940,035 | 6/1960 | Lefkowitz | 310/366 X |
| 3,397,329 | 8/1968 | Riedel | 310/315 |
| 4,451,753 | 5/1984 | Ogawa et al. | 310/315 |

FOREIGN PATENT DOCUMENTS

| | | | |
|---|---|---|---|
| 58-142227 | 8/1983 | Japan . | |
| 58-142228 | 8/1983 | Japan . | |
| 0099323 | 6/1984 | Japan | 310/319 |

OTHER PUBLICATIONS

"Analysis of Piezoelectric Benders Used as Knock Sensors", SAE Paper 830170 (1983).

Primary Examiner—Stewart J. Levy
Assistant Examiner—Scott M. Oldham
Attorney, Agent, or Firm—Cushman, Darby & Cushman

[57] ABSTRACT

A vibration and acoustic wave detecting device employing a piezoelectric element has a construction such that a piezoelectric element comprises a first surface electrode disposed on a first surface of the piezoelectric element and having a first output terminal of the detecting device, a second surface electrode opposite to the first surface thereof, a side electrode disposed to surround a side surface of the detecting device and having portions respectively extending over the first and second surfaces, the three electrodes being disposed separately from each other, and a resistor disposed on the piezoelectric element to extend across the first surface electrode and the side electrode and to be connected therewith electrically, and the piezoelectric element further comprises a conductive member which is attached to the piezoelectric element to be in contact with the second surface electrode and the side electrode and hence to provide electrical connection between both electrodes. The conductive member supports the piezoelectric element and also provides its second output terminal. Thus, the piezoelectric element and the resistor are electrically connected in parallel between the first and second output terminals of the detecting device. This construction makes it possible to simply and easily manufacture a detecting device incorporating a resistor for increasing the available frequency bandwidth without causing any problem in the manufacturing process.

11 Claims, 9 Drawing Figures

VIBRATION AND ACOUSTIC WAVE DETECTING DEVICE EMPLOYING A PIEZOELECTRIC ELEMENT

BACKGROUND OF THE INVENTION

1. Field of the Invention

This invention relates to a vibration and acoustic wave detecting device employing a piezoelectric element. More particularly, this invention relates to an improved construction of a resonant-type vibration and acoustic wave detecting device employing a piezoelectric element which makes it possible to increase its available frequency bandwidth by lowering its quality factor Q.

2. Description of the Prior Art

With respect to a piezoelectric knock sensing device of a type employing a piezoelectric conversion element, a piezoelectric type knock sensor having a construction in which a resistor is connected in parallel with a piezoelectric conversion element so as to broaden its available frequency bandwidth is already disclosed by prior art references, for example, by Japanese Patent Unexamined Publications Nos. 58-142227 and 58-142228.

As mentioned above, it is publicly known to make a resonant-type detector employing a piezoelectric element which has a construction in which a resistor is connected in parallel with the piezoelectric element to decrease its quality factor thereby to have a broad available frequency bandwidth, with a view to removing a defect such that the available frequency bandwidth becomes narrow as the quality factor increases. However, there is no prior art reference which has disclosed any concrete structure for incorporating a resistor in the resonant-type detector employing a piezoelectric element.

SUMMARY OF THE INVENTION

It is an object of the present invention to provide an improved construction of a vibration and acoustic wave detecting device employing a piezoelectric element such that, in the manufacture of the detecting device, there occurs no inconvenience in any process of the manufacture thereof and it is made very simple and easy to have a resistor connected in parallel with the piezoelectric element across its two output terminals for the purpose of increasing the available output frequency bandwidth.

According to the detecting device of this invention, due to the fact that, in the manufacturing process thereof, there are arranged a polarization step after a step of mounting a resistor on a piezoelectric element, which has electrodes attached thereto beforehand, and then the required assembly steps including a steps of mounting the piezoelectric element on a conductive member, there are great meritorious effects that the polarization of the piezoelectric element can be effected without causing any inconvenience and that the resistor can be mounted very simply and easily.

With the construction of the detecting device according to this invention, there is another effect that the adjustment of the resistance value of the resistor can be effected after the mounting of the resistor very easily during the manufacture of this detecting device.

With the construction of the detecting device according to this invention, there is still another effect that it is possible to easily obtain a detecting device comprising a plurality of piezoelectric elements connected commonly between two output terminals to operate in parallel with each other using a single resistor in common.

DESCRIPTION OF THE PREFERRED EMBODIMENTS

Figure 1:
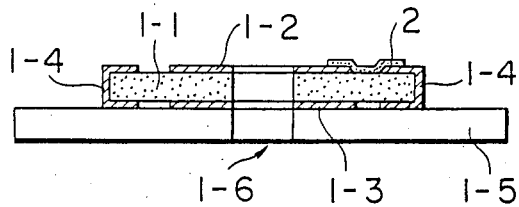
FIG. 1 is a longitudinal sectional view showing a complete overall construction of a detecting device of this invention.

The construction and operation of a vibration and acoustic wave detecting device employing a piezoelectric element (hereinafter simply referred to as a detecting device) will now be described with reference to the accompanying drawings. In the drawings, like reference numerals designate the same or similar constituent elements.

Referring to FIG. 1 illustrating the complete overall construction of the detecting device of this invention, numeral 1-1 designates a piezoelectric element made of a typical material such as lead titanate zirconate ceramics. Numeral 1-2 designates a first electrode deposited on a first surface of the piezoelectric element 1-1, 1-3 a second electrode deposited on a second surface of the piezoelectric element 1-1, and 1-4 a side electrode deposited across the first and second surfaces of the piezoelectric element 1-1 to surround its side surface. These electrodes 1-2, 1-3 and 1-4 are discretely arranged so as to be electrically isolated from each other on the surfaces of the piezoelectric element 1-1. It is to be noted that these electrodes are formed by depositing a material such as gold, silver, a silver-palladium alloy on the surfaces of the piezoelectric element 1-1 by using a printing technique or the like. Numeral 1-5 designates a conductive member made of a metallic material such as stainless steel (SUS) or Kovar which serves the purpose of supporting the piezoelectric element 1-1 attached thereonto by an adhesive or the like and functions as a diaphragm for transmitting the vibrations imparted thereto from an object to be tested to the piezoelectric element 1-1.

Numeral 2 designates a resistor formed by depositing through a printing technique or the like a pasty electric resistance material containing $RuO_2$, etc., on the first surface of the piezoelectric element 1-1 so that it extends across the respective ends of the first electrode 1-2 and the side electrode 1-4. Numeral 1-6 designates a hole which is formed through the complete detecting device shown in FIG. 1 and around a longitudinal center line thereof and which is used to fix the detecting device to a support of a detecting device supporting member when incorporating the detecting device in a detecting device assembly.

Figure 2:
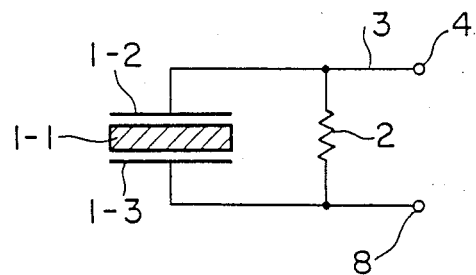
FIG. 2 is an electric circuit diagram showing an equivalent electric circuit of the detecting device shown in FIG. 1.
Figure 3:
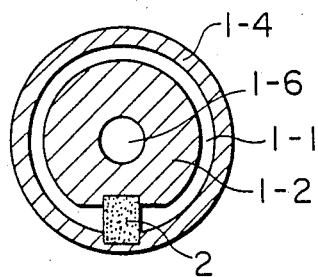
FIG. 3 is a plan view showing the first surface of the piezoelectric element used in the detecting device of this invention.
Figure 4:
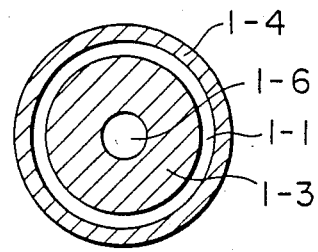
FIG. 4 is a bottom view showning the second surface of the piezoelectric element used in the detecting device of this invention.

FIG. 2 shows an equivalent electric circuit of the detecting device shown in FIG. 1. FIG. 3 is a plan view showing the first surface of the piezoelectric element unit used in the above-mentioned detecting device of this invention, and FIG. 4 is a bottom view showing the second surface of the piezoelectric element unit.

Next, a description will be made of the features of the construction and manufacturing process steps of the detecting device of this invention as shown in FIG. 1. It will be seen that this invention as shown in FIGS 1–4 is different from those of the prior art device.

Figure 5:
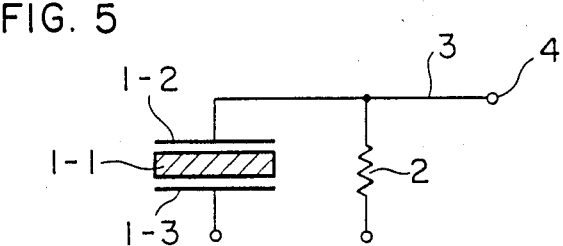
FIG. 5 is an electric circuit diagram showing an equivalent electric circuit of a detecting device of this invention with its piezoelectric element having electrodes formed thereon having not yet been attached to the surface of the conductive member (diaphragm), thus staying in a state thereof which has not yet reached the complete state of the detecting device of this invention shown in FIG. 1.

The printing process for depositing the resistor 2 on the first surface of the piezoelectric element 1-1 including a baking step. The resistor is printed so that it extends across the first surface electrode 1-2 and the side electrode 1-4. However, due to the baking step, the surface of the piezoelectric element 1-1 is usually exposed to a high temperature, of over 500° C., in the baking step. If the piezoelectric element 1-1 is polarized in advance of the baking step, the polarization characteristics of the piezoelectric element 1-1 are deteriorated by the application of heat in the baking step. Therefore, the polarizing step of the piezoelectric element 1-1 must be performed after the step of baking the resistor 2. Here, however, in the polarizing step of the piezoelectric element 1-1, a high dc field of several kilovolts/mm is applied to the piezoelectric element 1-1 for more than several minutes. Therefore, in this case, if the construction of the detecting device is represented by the equivalent circuit shown in FIG. 2, a heavy current flows through the resistor 2 during the polarizing step, so that a resistor 2 having a small current capacity will be burnt. Therefore, if a low current capacity resistor is used, the equivalent circuit of FIG. 5 is desirable during polarization. FIG. 5 shows the state where the first surface electrode 1-2, the second surface electrode 1-3 and the side electrode 1-4 have been deposited on the surface of the piezoelectric element 1-1. The the resistor 2 is deposited on the first surface of the piezoelectric element 1-1 so as to extend across the first surface electrode 1-2 and the side electrode 1-4 as shown in FIGS. 3 and 4. However, conductive member 1-5 has not been attached to the piezoelectric element 1-1. By not attaching conductive member 1-5, the equivalent electric circuit shown in FIG. 5 is yielded. Thus, in this state, even if a high dc voltage is applied across the first surface electrode 1-2 and the second surface electrode 1-3 to polarize the piezoelectric element 1-1, no current flows through the resistor 2, and therefore the polarization of the piezoelectric element 1-1 can be effected without any problem.

Then, after the completion of the polarizing step, the polarized piezoelectric element 1-1 is attached to the conductive member 1-5, whereupon the second surface electrode 1-3 and the side electrode 1-4 are electrically connected with each other through the conductive member 1-5. Thus, an equivalent circuit of the detecting device in the complete state becomes as shown in FIG. 2, and the polarized piezoelectric element 1-1 and the resistor 2 are electrically connected in parallel between a first output terminal 4 and a second output terminal 8 of the detecting device.

The detecting device of this invention operates in the following manner. Mechanical vibrations of an object under test are transmitted to the piezoelectric element 1-1 through the detecting device supporting member and the conductive member 1-5 acting as a diaphragm.

Thus, the piezoelectric element 1-1 is subjected to bending vibrations together with the conductive member 1-5, and the vibrations of the object are detected by an output voltage which is produced in the piezoelectric element 1-1, appears across the first surface electrode 1-2 and the second surface electrode 1-3 and is delivered from the output terminals 4 and 8.

Since the detecting device of this invention is of a resonant type, it has a disadvantage such that its available frequency bandwidth becomes narrow, although a high output voltage is obtained in a frequency range around the resonant frequency, as described before. This disadvantage can be removed by connecting the additional resistor 2 in parallel with the piezoelectric element 1-1 as shown in the equivalent circuit of FIG. 2 and by effecting the trimming (fine adjusting) of its value. With this arrangement, it is possible to easily obtain a detecting device which is capable of reducing variations in the sensitivity and possessing a suitable extended available frequency bandwidth, yet having a required output voltage level, even though the magnitude of the output voltage level is reduced by the provision of the resistor 2. Here, it is known from the disclosures of the aforementioned prior art references that, if R represents the resistance of the resistor 2, C the capacitance of the piezoelectric element 1-1 and f the resonant frequency, a maximum available frequency bandwidth is obtained when the resistance of the resistor 2 satisfies a relation $R = 1/(2\pi f \cdot C)$.

Figure 6:
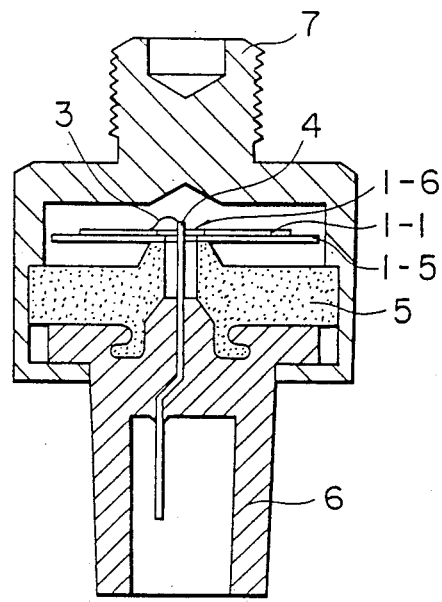
FIG. 6 is an overall sectional view of a knock sensing device as an example of practical application of the detecting device of this invention.

Next, an example of practical application of the detecting device of this invention as a knock sensing device will be described with reference to FIG. 6. FIG. 6 is an overall sectional view illustrating a construction of an example of practical application of the detecting device of the present invention in which it is incorporated in a knock sensing device assembly. In FIG. 6, numeral 6 designates a connector case made of an electrically insulating material, and 4 a connection pin for external connection of the output of the detecting device which is made of a conductive material and is molded in the connector case 6. Numeral 3 designates a lead wire one end of which is connected to the first surface electrode 1-2 of the piezoelectric element 1-1 and the other end of which is connected to an inner end of the pin 4. Numeral 5 designates a metal base. Fastened by welding or the like to the metal base 5 is the conductive member 1-5 acting as a diaphragm which is attached onto the second surface of the piezoelectric element 1-1 having the second surface electrode 1-3 deposited thereon. Numeral 7 designates a housing which has a threaded portion for the mounting thereof on the engine block and which encloses the base 5 and a base portion of the connector case 6 and holds them in a pressed state. Thus, the second surface electrode 1-3 of the piezoelectric element 1-1 is electrically connected to the housing 7 through the conductive member 1-5 and the base 5, so that the housing 7 functions as the second output terminal 8 in FIG. 2.

Figure 7:
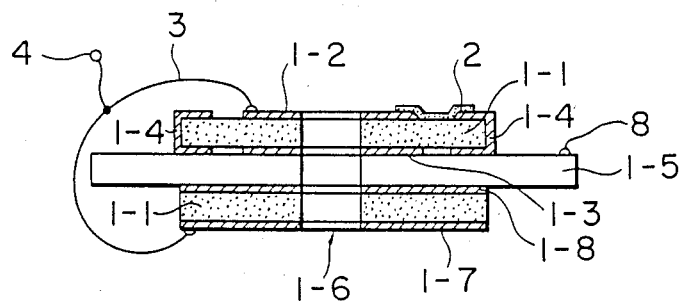
FIG. 7 is a longitudinal sectional view showing a longitudinal section of a complete detecting device of another embodiment of this invention using a combination of two or more piezoelectric elements each thereof having electrodes formed thereon.
Figure 8:
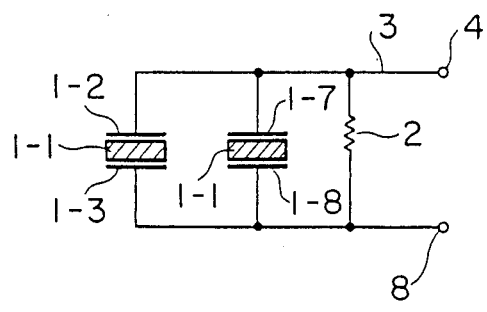
FIG. 8 is an electric circuit diagram showing an equivalent electric circuit of the detecting device of the embodiment of this invention shown in FIG. 7.

The detecting device of this invention may also have such a construction as that of the embodiment shown in FIG. 7, in which a piezoelectric elment having the first surface electrode, second surface electrode and side electrode and a resistor deposited thereon and one or more other piezoelectric element having only a first surface electrode and a second surface electrode deposited thereon are attached onto a single conductive member. In this case, the piezoelectric elements which are attached to the opposite surfaces of the conductive member are polarized with polarities opposite to each other before being attached to the conductive member. Referring to FIG. 7 numerals 1-7 and 1-8 designate the first surface and second surface electrodes of the other piezoelectric element, respectively. FIG. 8 shows an equivalent circuit of the embodiment shown in FIG. 7.

Figure 9:
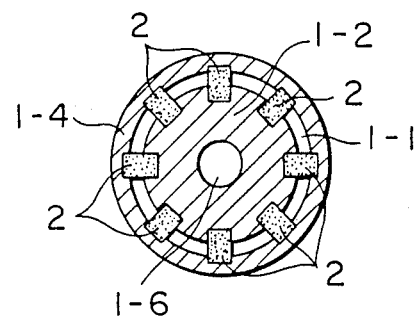
FIG. 9 is a plan view of a piezoelectric element having a number of resistance pieces arranged on its first surface so as to facilitate the trimming of the resistance value of the resistor attached to the piezoelectric element in the detecting device of this invention.

As described hereinabove, in the detecting device of this invention, the trimming of the resistance of the resistor 2 is performed by using a laser beam or the like to have an optimum value thereof. Here, in order to facilitate the trimming operation, it is possible to deposit a large number of small resistors (resistance pieces) 2, each thereof having a suitable width, on the first surface of the piezoelectric element as shown in FIG. 9, and then these small resistors may be cut one by one as occasion demands, thereby attaining the trimming more easily.

We claim:

1. A vibration and acoustic wave detecting device comprising:
   at least one piezoelectric element having a first surface, a second surface and a side surface, said piezoelectric element including a first surface electrode formed on said first surface and provided with a first output terminal of said detecting device, a second surface electrode formed on said second surface, and a side electrode formed to surround said side surface said side electrode having portions extending over portions of said first surface and over portions of said second surface, respectively, said first surface electrode, said second surface electrode and said side electrode being formed discretely and electrically insulated from one another;
   a resistor formed on said first surface of said piezoelectric element to extend over a portion of said first surface electrode and over a portion of said portion of said side electrode extending over said first surface, said resistor being electrically connected with said first surface electrode and said side electrode; and
   conductive plate means fixed to said piezoelectric element, for supporting said piezoelectric element and adapted to be electrically connected to an outer surface of said second surface electrode and an outer surface of said portion of said side electrode extending over said second surface to provide an electrical connection between said side electrode and said second electrode, there by providing a second output terminal of said detecting device, and for serving as a diaphragm for said device;
   whereby said piezoelectric element and said resistor are electrically connected in parallel with each other between said first and second output terminals of said detecting device.

2. A detecting device according to claim 1, wherein said resistor is composed of a plurality of resistance pieces, each extending across said first surface electrode and said portion of said side electrode extending over said first surface, and each being electrically connected therewith, respectively.

3. A detecting device according to claim 1, further comprising at least one other piezoelectric element including only a first surface electrode and a second surface electrode but no resistor, and having an outer surface of said second surface electrode thereof attached to at least one of a surface of said conductive member, which is attached to said first-mentioned piezoelectric element, and an opposite surface thereof, thereby electrically connecting the outer surface of said second surface electrode with said at least one surface, and wherein electrical connection is provided between said first surface electrode of said first-mentioned piezoelectric element including said resistor and said first surface electrode of said other piezoelectric element.

4. A device as in claim 1 wherein said conductive plate means is fixed to said piezoelectric element after said piezoelectric element has been subjected to a polarizing treatment.

5. A vibration and acoustic wave detecting device employing a piezoelectric element, comprising:
   a first surface electrode disposed on a first surface of said piezoelectric element and provided with a first output terminal of said detecting device;
   a second surface electrode disposed on a second surface of said piezoelectric element;
   a side electrode having portions respectively extending over portions of said first and second surfaces of said piezoelectric element, said first surface electrode, said second surface electrode and said side electrode being disposed discretely;
   a resistor disposed on said piezoelectric element to extend between said first surface electrode and said portion of said side electrode extending over said first surface thereby providing electrical connection between said both electrodes;
   a conductive member means, wherein said polarized piezoelectric element is adapted to be attached to a surface of said conductive member means for supporting said polarized piezoelectric element and for forming a second output terminal of said detecting device in such a manner that an outer surface of said second surface electrode and an outer surface of said portion of said side electrode extending over said second surface are brought into contact with said surface of said conductive member means so that said second surface electrode and said side electrode are electrically connected with each other through said conductive member means, thereby electrically connecting said polarized piezoelectric element and said resistor in parallel between said first and second output terminals of said detecting device, said conductive member means being attached after polarization of said piezoelectric element.

6. A piezoelectric apparatus, comprising:

a piezoelectric element having a first surface, a second surface, and a third surface extending between said first and second surfaces;

a first electrode formed on said first surface, and having a first output terminal electrically coupled thereto;

a second electrode formed on said second surface and having a second output terminal electrically coupled thereto;

a side electrode, disposed on said first, second and third surfaces, and electrically insulated from said first and second electrodes;

a resistive structure deposited on said first surface and electrically coupled between said first electrode and said side electrode; and conductive means adapted for being coupled to said second surface to support said piezoelectric apparatus and to electrically couple said side electrode to said second electrode, so that no current will flow through said resistive structure during a polarization operation of said piezoelectric element if said conductive means is not coupled between said second electrode and said side electrode.

7. An apparatus as in claim 6 wherein said conductive means is also for serving as a diaphragm for said piezoelectric apparatus.

8. An apparatus as in claim 7 wherein said piezoelectric element and said first and second electrodes are formed with a hole therein, and wherein said hole is used for mounting said piezoelectric apparatus.

9. An apparatus as in claim 7 wherein said resistive structure is of a type which can have a resistance thereof adjusted by laser trimming.

10. An apparatus as in claim 7 wherein said conductive means is attached between said second electrode and said side electrode after a polarization of said piezoelectric element.

11. An apparatus as in claim 7 wherein said piezoelectric element has a cross-section which is substantially rectangular, and wherein said first and second electrode are substantially flat plates and wherein said conductive means has a conductive surface which is substantially flat.

* * * * *